United States Patent
Funabiki et al.

(10) Patent No.: US 10,378,916 B2
(45) Date of Patent: Aug. 13, 2019

(54) DISPLAY APPARATUS FOR VEHICLE AND DISPLAY METHOD OF DISPLAY APPARATUS FOR VEHICLE

(71) Applicant: Panasonic Intellectual Property Management Co., Ltd., Osaka (JP)

(72) Inventors: Makoto Funabiki, Osaka (JP); Keiichiro Obayashi, Osaka (JP); Takayoshi Koyama, Osaka (JP); Jun Imamura, Osaka (JP); Tadashi Shibata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 271 days.

(21) Appl. No.: 15/216,990

(22) Filed: Jul. 22, 2016

(65) Prior Publication Data

US 2016/0327402 A1    Nov. 10, 2016

Related U.S. Application Data

(63) Continuation of application No. PCT/JP2015/000485, filed on Feb. 4, 2015.

(30) Foreign Application Priority Data

Feb. 5, 2014  (JP) ................. 2014-020042

(51) Int. Cl.
  *G01C 21/36* (2006.01)
  *B60K 35/00* (2006.01)
  (Continued)

(52) U.S. Cl.
  CPC ............ *G01C 21/365* (2013.01); *B60K 35/00* (2013.01); *B60K 37/02* (2013.01); *B60W 40/02* (2013.01);
  (Continued)

(58) Field of Classification Search
  CPC ........ G09B 29/10; G01C 21/30; G01C 21/36; G01C 21/3632; G01C 21/367;
  (Continued)

(56) References Cited

U.S. PATENT DOCUMENTS 4,625,329 A * 11/1986 Ishikawa ................... B60R 1/07
                                                180/271
5,757,289 A    5/1998 Nimura et al.
(Continued)

FOREIGN PATENT DOCUMENTS

JP    2006-90844     4/2006
JP    2006-343194    12/2006
(Continued)

OTHER PUBLICATIONS

International Search Report dated Apr. 28, 2015 in corresponding International Application No. PCT/JP2015/000485.

*Primary Examiner* — Abby Y Lin
*Assistant Examiner* — Sanjeev Malhotra
(74) *Attorney, Agent, or Firm* — Wenderoth, Lind & Ponack, L.L.P.

(57) ABSTRACT

A peripheral information obtaining unit, a road information obtaining unit, and a communication unit which are included in a driving environment obtaining unit obtain information indicating a current state of a drive environment. A driver information obtaining unit and a vehicle information obtaining unit which are included in a driving state obtaining unit obtain information indicating a driving state of a current driver. A display controller controls at least one of a display position and a display timing of a guidance sign to be displayed on a display unit, based on at least one of the pieces of information which are output from the driving environment obtaining unit, the driving state obtaining unit, and a route guiding unit.

3 Claims, 11 Drawing Sheets

(51) Int. Cl.
*G09G 5/00* (2006.01)
*G09G 5/377* (2006.01)
*G08G 1/0969* (2006.01)
*B60W 40/02* (2006.01)
*B60W 40/08* (2012.01)
*G08G 1/0962* (2006.01)
*B60K 37/02* (2006.01)

(52) U.S. Cl.
CPC ........... *B60W 40/08* (2013.01); *G08G 1/0969* (2013.01); *G08G 1/09623* (2013.01); *G08G 1/09626* (2013.01); *G09G 5/00* (2013.01); *G09G 5/377* (2013.01); *G09G 2310/08* (2013.01); *G09G 2340/12* (2013.01); *G09G 2380/10* (2013.01)

(58) Field of Classification Search
CPC .............. G01C 21/3682; G01C 1/0969; G08G 1/096838; G08G 1/096827; G08G 1/143; G08G 1/147; B60K 35/00; G02B 27/0101; G06F 19/00; G06Q 10/02; G06Q 50/24
USPC ... 701/431, 1, 301, 426, 428, 437, 438, 455, 701/532, 533, 2, 37, 49, 408; 340/436, 340/988, 990, 995.1; 345/589; 359/599, 359/630, 633; 280/735; 180/271
See application file for complete search history.

(56) References Cited

U.S. PATENT DOCUMENTS

| | | | | |
|---|---|---|---|---|
| 5,928,308 A * | 7/1999 | Nanba | ................ | G01C 21/3626 340/990 |
| 6,144,318 A * | 11/2000 | Hayashi | ............ | G01C 21/3658 340/988 |
| 6,501,536 B1 * | 12/2002 | Fredricks | .................. | B60R 1/02 180/271 |
| 2001/0023390 A1 * | 9/2001 | Gia | ........................ | G01C 21/00 701/301 |
| 2001/0037176 A1 * | 11/2001 | Mikame | ............ | G01C 21/3632 701/431 |
| 2001/0044678 A1 * | 11/2001 | Ito | .......................... | G01C 21/26 701/1 |
| 2002/0010543 A1 * | 1/2002 | Watanabe | ......... | G01C 21/3608 701/438 |
| 2003/0128436 A1 * | 7/2003 | Ishii | ....................... | G02B 27/01 359/630 |
| 2003/0209893 A1 * | 11/2003 | Breed | ..................... | B60J 10/00 280/735 |
| 2004/0153238 A1 * | 8/2004 | Miyahara | ............... | G01C 21/32 701/426 |
| 2005/0021205 A1 * | 1/2005 | Niwa | ................... | B60G 17/016 701/37 |
| 2005/0021227 A1 * | 1/2005 | Matsumoto | ........ | G01C 21/3415 701/431 |
| 2005/0190197 A1 * | 9/2005 | Ebi | ..................... | G01C 21/3667 345/589 |
| 2005/0273218 A1 * | 12/2005 | Breed | ..................... | B60C 11/24 701/2 |
| 2007/0061070 A1 * | 3/2007 | Aoto | ...................... | G01C 21/30 701/455 |
| 2007/0115142 A1 * | 5/2007 | Nakashima | ........ | G01C 21/3682 340/995.1 |
| 2008/0040033 A1 * | 2/2008 | Mutoh | ................. | G01C 21/367 701/437 |
| 2009/0088930 A1 * | 4/2009 | Ohtsubo | .............. | B60N 2/0252 701/49 |
| 2009/0216434 A1 * | 8/2009 | Panganiban | ......... | G01C 21/367 701/532 |
| 2009/0240426 A1 | 9/2009 | Akita et al. | | |
| 2009/0326814 A1 | 12/2009 | Harumoto et al. | | |
| 2010/0007480 A1 * | 1/2010 | Uozumi | ................... | A61B 5/18 340/436 |
| 2010/0042318 A1 * | 2/2010 | Kaplan | ................... | G01C 21/30 701/426 |
| 2010/0131190 A1 | 5/2010 | Terauchi et al. | | |
| 2010/0164702 A1 | 7/2010 | Sasaki et al. | | |
| 2010/0198501 A1 * | 8/2010 | Otani | .................. | G01C 21/3632 701/533 |
| 2010/0318290 A1 * | 12/2010 | Kaplan | ................. | G01C 21/30 701/426 |
| 2011/0288766 A1 * | 11/2011 | Nagasawa | .......... | G01C 21/3632 701/533 |
| 2012/0323487 A1 * | 12/2012 | Sempuku | ........... | G01C 21/367 701/428 |
| 2013/0054136 A1 * | 2/2013 | Tomita | ............... | G01C 21/3629 701/428 |
| 2013/0090850 A1 * | 4/2013 | Mays | ..................... | G01C 21/36 701/533 |
| 2016/0004077 A1 * | 1/2016 | Yanagisawa | ........... | B60K 35/00 359/633 |
| 2016/0046189 A1 * | 2/2016 | Inomata | ............ | G02B 27/0101 359/599 |
| 2016/0132530 A1 * | 5/2016 | Misu | ..................... | G06F 16/29 701/408 |

FOREIGN PATENT DOCUMENTS

| | | |
|---|---|---|
| JP | 2010-156608 | 7/2010 |
| JP | 2011-47649 | 3/2011 |
| JP | 2011-64760 | 3/2011 |
| WO | 2007/145190 | 12/2007 |

* cited by examiner

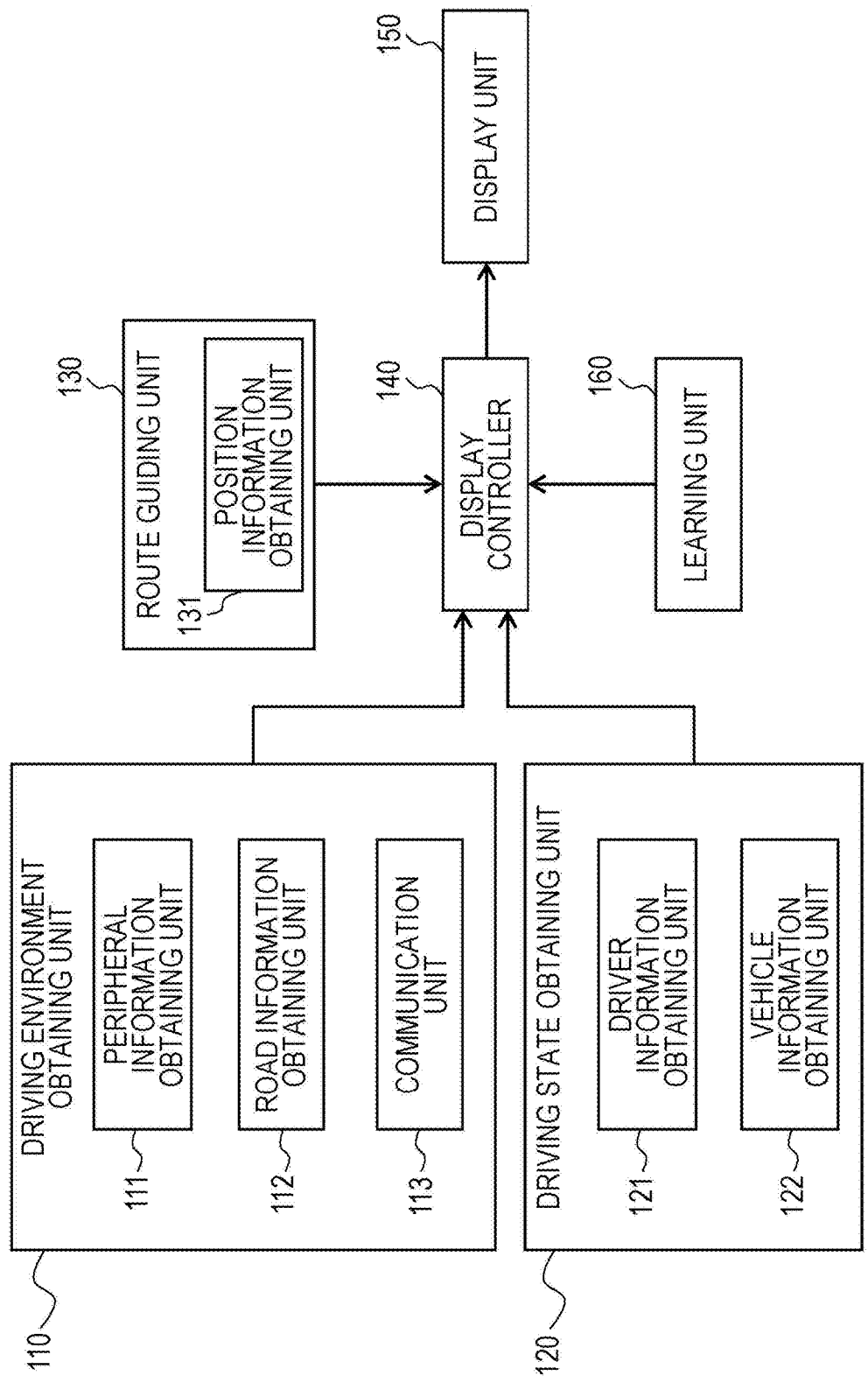

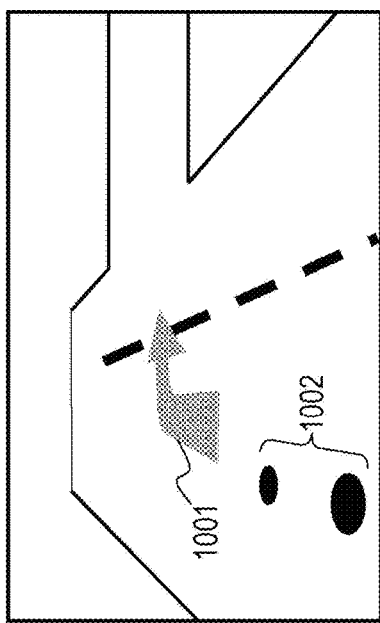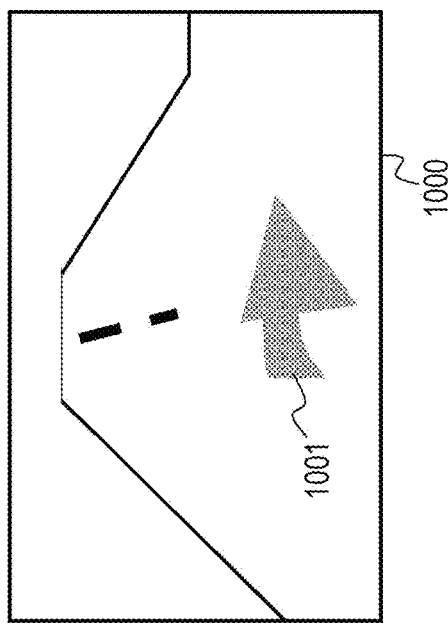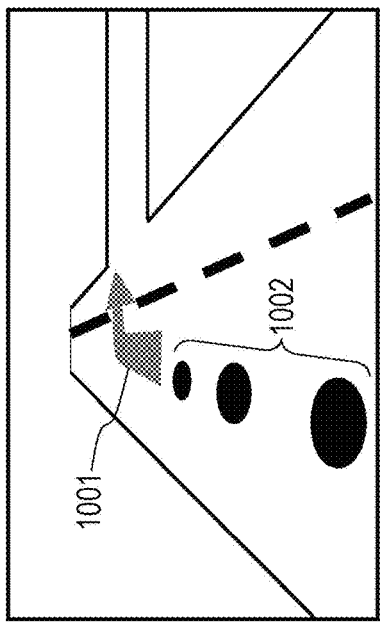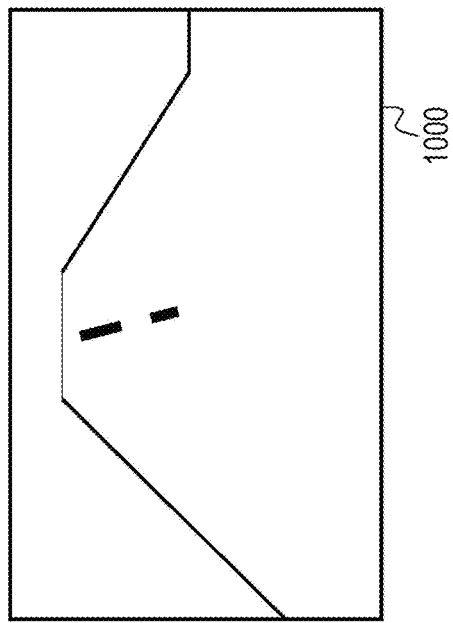

DISPLAY APPARATUS FOR VEHICLE AND DISPLAY METHOD OF DISPLAY APPARATUS FOR VEHICLE

BACKGROUND

1. Technical Field

The present disclosure relates to a display apparatus for a vehicle which provides guidance on a route to a destination.

2. Description of the Related Art

Unexamined Japanese Patent Publication No. 2011-64760 discloses a display apparatus for a vehicle in which a route guidance sign for providing guidance on a route to a destination can be easily recognized. This display apparatus for a vehicle includes a controller which causes a display device to display a guide mark for navigating the route to the destination while changing a height of the guide mark, depending on a distance from a current position of the vehicle to a guide point. With this arrangement, the guide mark is displayed without overlapping on a displayed image of a road; therefore, the route to the destination can be displayed for guidance.

SUMMARY

A display apparatus for a vehicle of the present disclosure includes: a route guiding unit which generates route information for providing guidance on a route to a destination; a display unit which displays a guidance sign to be superimposed on a driver's front view, the guidance sign indicating a route from a traveling position of the vehicle to a guide point; and a display controller which determines a display position and a display timing of the guidance sign, depending on the route information and depending on a display area of the display unit on the driver's front view, and which causes the display unit to display the guidance sign at the determined display timing at the determined display position, wherein when at least one of road environment information, driving state information, and route information satisfies a predetermined condition under which the guidance sign cannot be displayed in the display area, the display controller changes any one or both of the determined display position and the determined display timing.

A display method of the present disclosure is a display method of a display apparatus for a vehicle, the display apparatus including: a route guiding unit which generates route information for providing guidance on a route to a destination; and a display unit which displays a guidance sign to be superimposed on a driver's front view, the guidance sign indicating a route from a traveling position of the vehicle to a guide point, wherein the display method includes: determining a display position and a display timing of the guidance sign, depending on the route information and depending on a display area of the display unit on the driver's front view; causing the display unit to display the guidance sign at the determined display timing at the determined display position; and changing, when at least one of road environment information, driving state information, and route information satisfies a predetermined condition under which the guidance sign cannot be displayed in the display area, any one or both of the determined display position and the determined display timing.

With this arrangement, it is possible to provide the driver with route guidance at an appropriate timing.

BRIEF DESCRIPTION OF DRAWINGS

FIG. 1 is a block diagram showing a configuration of a display apparatus for a vehicle in a first exemplary embodiment;

FIG. 10A is a diagram for illustrating an example of a guidance sign in a second exemplary embodiment;

FIG. 10B is a diagram for illustrating an example of the guidance sign in the second exemplary embodiment;

FIG. 10C is a diagram for illustrating an example of the guidance sign in the second exemplary embodiment;

FIG. 10D is a diagram for illustrating an example of the guidance sign in the second exemplary embodiment;

DETAILED DESCRIPTION

Figure 2B:
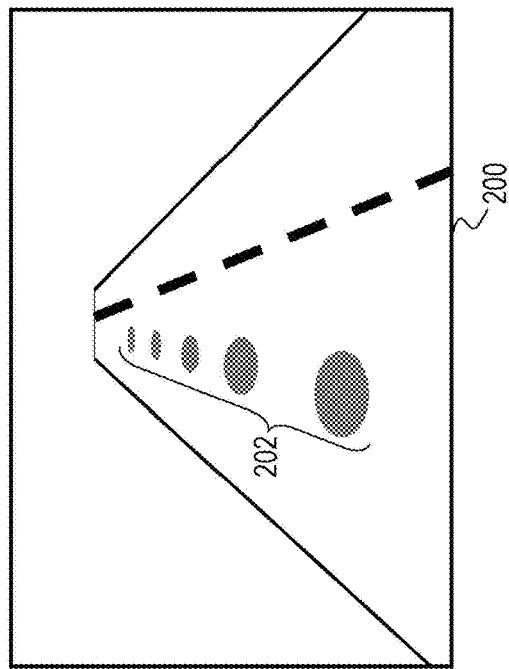
FIG. 2B is a diagram showing an example of a guidance sign in the first exemplary embodiment.

In the following, exemplary embodiments will be described in detail appropriately with reference to the drawings. However, unnecessarily detailed description may be omitted. For example, detailed description for already wellknown matters or overlapping description for substantially identical configurations may be omitted. This is to prevent the following description from being unnecessarily redundant and thus to help those skilled in the art to easily understand the description.

Note that the accompanying drawings and the following description are provided to help those skilled in the art to sufficiently understand the present disclosure, but are not intended to limit the subject matters of the claims.

First Exemplary Embodiment

In the following, a first exemplary embodiment will be described with reference to the drawings.

[1-1. Configuration]

FIG. 1 is a block diagram showing a configuration of a display apparatus for a vehicle according to a first exemplary embodiment.

The display apparatus for a vehicle includes driving environment obtaining unit 110, driving state obtaining unit 120, route guiding unit 130, display controller 140, display unit 150, and learning unit 160.

Driving environment obtaining unit 110 includes peripheral information obtaining unit 111, road information obtaining unit 112, and communication unit 113. Driving state obtaining unit 120 includes driver information obtaining unit 121 and vehicle information obtaining unit 122. Route guiding unit 130 includes position information obtaining unit 131.

Peripheral information obtaining unit 111 obtains peripheral information which indicates information around the vehicle. As the peripheral information, for example, brightness around the vehicle, a gradient of a road, and presence or absence of a front vehicle and the like are used. The peripheral information is obtained from various sensors such as an illuminance sensor, a gyro sensor, and a radar installed in the vehicle or a video of a camera.

Road information obtaining unit 112 obtains road information while the vehicle is running. As the road information, for example, a number of traffic lanes and a speed limit and the like are used. The road information is obtained from the camera installed in the vehicle or information stored in a navigation system.

Communication unit 113 communicates with various servers on the internet to obtain driving environment information. Examples of the driving environment information include weather and traffic information (statistics of sudden braking, an accident black spot, and the like).

Driver information obtaining unit 121 obtains driver information which indicates a state of the driver. Here, examples of the state of the driver include a degree of arousal and presence or absence of looking-aside driving or careless driving. The driver information is obtained from the camera and the sensor (biological sensor or heartbeat sensor) installed in the vehicle.

Vehicle information obtaining unit 122 obtains vehicle information which indicates a state of a running vehicle. Examples of the vehicle information include a vehicle speed, an acceleration state, a braking state, and an inclination of the vehicle. The vehicle information is obtained from a CAN (Control Area Network) or a vehicle speed pulse.

Route guiding unit 130 obtains information of a current traveling position from position information obtaining unit 131 to generate route information for providing guidance on a route to a destination set by the driver. Route guiding unit 130 is, for example, a navigation system. Route guiding unit 130 manages a current time. Note that, instead of being managed by route guiding unit 130, the time may be managed by other components (also including components which are not shown).

Display controller 140 determines a display position, a display manner, or a display timing of a guidance sign to be displayed on display unit 150, depending on the route information and depending on a display area of display unit 150 on a front view of the driver. Display controller 140 causes display unit 150 to display the guidance sign at the determined display timing at the determined display position. Display controller 140 compares a predetermined condition with at least one of the following pieces of information: road environment information which is output from driving environment obtaining unit 110; driving state information which is output from driving state obtaining unit 120; the route information which is output from route guiding unit 130; and information obtained from learning unit 160. Display controller 140 determines whether the obtained information satisfies the predetermined condition under which the guidance sign cannot be displayed within the display area, and if the predetermined condition is satisfied, display controller 140 changes any one or both of the display position and the display timing.

Display unit 150 shows the driver the route information by superimposing on the driver's front view the guidance sign indicating the route from the traveling position of the vehicle to a guide point so as to display the guidance sign. Display unit 150 superimposes a display image on a real image ahead by using, for example, a head-up display (HUD). Alternatively, a display of a car navigation system or an LED display may be used. The present disclosure describes a case that an HUD is used as display unit 150, and a display area of display unit 150 is referred to as an HUD display area.

Learning unit 160 learns characteristics of a driving operation of the driver. Examples of the characteristics of the driving operation include timings of accelerator, braking, and a blinker. These pieces of information are obtained from the CAN.

[1-2. Predetermined Condition Under which the Guidance Sign Cannot be Displayed]

Display controller 140 controls the display position and the display timing of the guidance sign to be displayed on display unit 150 by using at least one of the below described conditions. Display controller 140 may control the display position and the display timing of the guidance sign by combining a plurality of conditions.

The conditions will be described below. The operations of display controller 140 under the conditions are examples, and other operations than the described operations may be performed.

[1-2-1. Vehicle Speed]

If the vehicle speed is higher than a predetermined speed, display controller 140 controls such that the guidance sign is displayed earlier than a normal display timing. Display controller 140 adjusts the display timing so that the value of (a remaining distance to the guide point)/(the vehicle speed) is constant for the higher speed. With this arrangement, the driver can grasp the time to reach the guide point (for example, an intersection) with the same feeling with respect to time. The vehicle speed is obtained by vehicle information obtaining unit 122 from, for example, the CAN, and is output to display controller 140.

[1-2-2. Status of Driver]

If the driver is in a careless state or is looking aside, display controller 140 controls such that the guidance sign is displayed earlier than the normal display timing. Display controller 140 controls so that the guidance sign is displayed earlier in consideration of a time for the driver to get back to a normal state. This arrangement improves safety of driving.

The state of the driver is obtained by driver information obtaining unit 121 by using a camera or a sensor installed in the vehicle, and is output to display controller 140.

[1-2-3. Weather]

If the weather is rainy or snowy, display controller 140 controls such that the guidance sign is displayed earlier than the normal display timing. With this arrangement, when visibility is poor because of, for example, rain or when there is a risk of sudden braking while snowing, it is possible to reduce a speed near an intersection earlier than normal; therefore, the driver has enough time to confirm safety. The information of weather is obtained by communication unit 113 communicating with a server on the internet, and is output to display controller 140.

[1-2-4. Brightness Around Vehicle]

If display controller 140 determines that brightness around the vehicle is brighter than predetermined brightness, display controller 140 controls such that the guidance sign is displayed earlier than the normal timing. When the visibility is poor due to darkness around the vehicle, the guidance sign is displayed at an earlier timing than normal; therefore, the driver can reduce the speed near an intersection earlier than normal, whereby the driver has enough time to confirm safety.

The brightness around the vehicle is obtained by peripheral information obtaining unit 111 from an illuminance sensor (not shown), and the obtained information of the brightness is output to display controller 140. Alternatively, instead of obtaining the information from the illuminance sensor, peripheral information obtaining unit 111 may obtain the brightness around the vehicle from a lighting state of a headlight.

[1-2-5. Time]

If display controller 140 determines that a current time is later than a predetermined time, display controller 140 controls such that the guidance sign is displayed earlier than the normal display timing. Because the guidance sign is displayed earlier in a time slot in which the visibility is poor because of darkness, the driver can reduce the speed near an intersection earlier than normal, whereby the driver has enough time to confirm safety. The time information is obtained by route guiding unit 130, and is output to display controller 140. However, in a case that the time information is managed in another block, the time information may be obtained from that block.

[1-2-6. Number of Traffic Lanes]

If the display controller 140 determines that the number of traffic lanes is greater than a predetermined number of traffic lanes, display controller 140 controls such that the guidance sign is displayed earlier than the normal timing. With this arrangement, even if it cannot be detected which traffic lane the vehicle is running on, the driver has enough time to change traffic lanes.

Further, in a case that display controller 140 determines whether there is a possibility of changing traffic lanes, based on the vehicle traveling traffic lane and the number of traffic lanes, and if it is necessary to change traffic lanes, display controller 140 controls such that the guidance sign is displayed earlier than the normal timing. With this arrangement, the driver can change traffic lanes with more time to spare. Further, if the vehicle is not running on a traffic lane on which the vehicle should run, display controller 140 controls so as to display the guidance sign earlier.

Regarding the number of traffic lanes, the number of traffic lanes and the vehicle traveling traffic lane are determined by road information obtaining unit 112 from a video taken by, for example, a camera, and are output to display controller 140. However, the number of traffic lanes and the vehicle traveling traffic lane may be obtained from route guiding unit 130.

[1-2-7. Speed Limit]

If the speed limit is higher than the predetermined speed, display controller 140 controls such that the guidance sign is displayed earlier than the normal timing. With this arrangement, even if the vehicle speed cannot be obtained, the driver does not have to be in haste to drive the vehicle. The speed limit is obtained by road information obtaining unit 112 from, for example, a navigation system, and is output to display controller 140. The speed limit may be obtained by communication unit 113.

[1-2-8. Weight]

If a weight of the vehicle is heavier than a predetermined weight, display controller 140 determines that a number of occupants or an amount of baggage is large, and controls such that the guidance sign is displayed earlier than the normal timing. When the weight is heavy, a braking distance is long. However, the driver has enough time to safely reduce the speed. Regarding the weight, the weight loaded on a tire suspension is obtained by vehicle information obtaining unit 122 and is output to display controller 140. However, vehicle information obtaining unit 122 may recognize the number of occupants by an on-board camera.

[1-2-9. Number of Intersections in the Vicinity]

If display controller 140 determines that there is another intersection in the vicinity of the guide point, display controller 140 delays the timing of displaying the guidance sign to prevent the driver from mistaking that the another intersection is the intersection at which the diver should turn left or right. Regarding the number of intersections, the number of the intersections near the guide point is obtained from map information, which is previously stored in route guiding unit 130, and is output to display controller 140.

[1-2-10. Reliability of Positional Accuracy]

If display controller 140 determines that a reliability of a current positional accuracy is lower than a predetermined reliability, display controller 140 controls such that the guidance sign is displayed earlier than the normal display timing. With this arrangement, the driver has enough time to identify the guide point (intersection or the like). The reliability of the positional accuracy is determined by position information obtaining unit 131, based on information such as the number of communication satellites with which route guiding unit 130 are communicating, and route guiding unit 130 outputs the reliability of the positional accuracy to display controller 140.

[1-2-11. Road Shape]

A road shape includes a road gradient, a curve, and the like. Display controller 140 determines whether the road declines toward a traveling direction. If display controller 140 determines that the road declines toward the traveling direction, display controller 140 controls such that the guidance sign is displayed earlier than normal. In particular, if an ascending slope becomes a descending slope, the HUD display area, which the driver can see, becomes narrow; therefore, control is performed so as to display the guidance sign earlier.

Since the guidance sign is displayed at the timing earlier than normal, as described above, in the case of the descending slope, even if the braking distance is longer, the driver has enough time to safely reduce the speed.

Further, display controller 140 determines whether there is a curve toward the traveling direction. Because the driver has to reduce the speed when a curve comes close, display controller 140 controls such that the guidance sign is displayed earlier.

Regarding the road shape such as a road gradient, peripheral information obtaining unit 111 obtains road gradient information from a gyro sensor (not shown) or a previously stored three-dimensional map. However, the three-dimensional map may be obtained through communication.

Further, in a case that the road shape is complex, display controller 140 displays the guidance sign in a higher priority earlier, and displays the guidance sign in a lower priority later. With this arrangement, the driver can drive without getting confused.

[1-2-12. Presence or Absence of Peripheral Vehicle]

Peripheral vehicles include a vehicle around the object vehicle, such as a front vehicle, a vehicle parked on the road, a rear vehicle. If display controller 140 determines that there is, for example, a front vehicle, display controller 140 controls so as to display the guidance sign earlier. With this arrangement, the driver can reduce the speed earlier if there is a front vehicle. Display controller 140 obtains information of an inter-vehicle distance to the front vehicle, and display controller 140 controls so as to display the guidance sign earlier as the inter-vehicle distance is shorter. With this arrangement, if the front vehicle is braked, the driver has enough time to reduce the speed of the vehicle.

Further, display controller 140 controls the display position of the guidance sign, based on the presence or absence of a peripheral vehicle. If display controller 140 determines that a distant view is blocked by a front vehicle, a vehicle parked on the road, or the like, display controller 140 makes the guidance sign be displayed at the display position displaced longitudinally and horizontally directions so that the guidance sign does not overlap such a vehicle.

Further, if there are many peripheral vehicles, display controller 140 controls so as to advance the display timing of the guidance sign, in consideration of possibility that a time period of the HUD display area being displayed may be limited.

Regarding the presence or absence of a peripheral vehicle, peripheral information obtaining unit 111 outputs to display controller 140 a video of the front view taken by, for example, a camera (not shown) as information of the presence or absence. However, peripheral information obtaining unit 111 may also determine the presence or absence of peripheral vehicles from the obtained information, and may output the information of the presence or absence. Further, peripheral information obtaining unit 111 may output an inter-vehicle distance to a front vehicle.

[1-2-13. Statistical Data]

Statistical data includes data of a sudden braking black spot, an accident black spot, and the like. If display controller 140 determines that there is a sudden braking black spot ahead, display controller 140 controls such that the guidance sign is displayed earlier than normal. With this arrangement, the guidance sign can be displayed earlier at the sudden braking black spot, and the driver thus does not have to be in haste to drive the vehicle (turn left or right).

The statistical data is obtained by communication unit 113 connecting to a server on the internet, and is output to display controller 140. However, data stored in route guiding unit 130 may be used as the statistical data.

[1-2-14. Presence or Absence of Difficult Intersection]

If there is a complex-shaped intersection (difficult intersection) in the traveling direction, display controller 140 controls such that the guidance sign is displayed earlier than the normal timing. With this arrangement, the driver has enough time to grasp the difficult intersection. The information of the difficult intersection is obtained by road information obtaining unit 112 from the navigation system or the like, and is output to display controller 140.

[1-2-15. Traffic Congestion Information]

If display controller 140 determines that there is traffic congestion ahead, display controller 140 controls such that the guidance sign is displayed earlier than the normal display timing. With this arrangement, the driver has enough time to reduce the speed. Regarding the traffic congestion information, the information of traffic congestion ahead is obtained by road information obtaining unit 112 from a camera or the like, and is output to display controller 140. However, the traffic congestion information may be obtained by communication unit 113

[1-2-16. Characteristics in Driving Operation of Each Person]

Display controller 140 controls the display timing of the guidance sign, based on characteristics of driving operation of each person. For example, for a driver who brakes late, the guidance sign can be less annoying to the driver by setting the display timing slightly later than normal. Regarding the characteristics of driving operation, learning unit 160 learns the characteristics of driving operation of each person, and outputs the characteristic information of the operation to display controller 140.

[1-2-17. Inclination of Vehicle]

If display controller 140 determines from information of inclination of the vehicle that the vehicle is inclined forward, display controller 140 makes the guidance sign be displayed earlier than the normal display timing. If the vehicle is inclined forward, a shorter part of the road surface ahead is within the HUD display area, and the driver can first notice the display later than in the case that the vehicle is not inclined. By displaying the guidance sign earlier, the guidance can be shown to the driver at the same timing as in the case that the vehicle is not inclined. The inclination of the vehicle is obtained by vehicle information obtaining unit 122, and is output to display controller 140.

[1-2-18. Vibration of Vehicle]

If the display controller 140 determines from vibration information of the vehicle that vibration of the vehicle is large, display controller 140 makes the guidance sign be displayed earlier than the normal display timing. If the vibration of the vehicle is large, the guidance sign is also vibrated, whereby the driver cannot estimate the precise distance. By displaying the guidance sign earlier than the normal display timing, the guidance sign can be viewed by the driver for a longer time, and the distance can be easily estimated. The vibration information of the vehicle is obtained by vehicle information obtaining unit 122 and is output to display controller 140.

[1-2-19. Height of Driver's Viewpoint]

Display controller 140 compares a height of a driver's viewpoint with a reference position to control the display position and the display timing of the guidance sign.

If display controller 140 determines that the driver's viewpoint is higher than the reference position, display controller 140 makes the guidance sign be displayed earlier than the normal display timing. If the driver's viewpoint is higher than the reference position, the driver looks down the HUD display. Therefore, a shorter part of the road surface ahead is within the HUD display area. Thus, the guidance sign cannot be displayed at a long distance. As a result, the driver can first notice the display later than in the case that the driver's viewpoint is equal to the reference position. By displaying the guidance sign earlier, the guidance sign can be shown to the driver in the same timing as in the case that the height of the driver's viewpoint is equal to the reference position. The height of the driver's viewpoint is obtained by driver information obtaining unit 121 and is output to display controller 140.

[1-2-20. Display Position of HUD]

Display controller 140 compares a display position of the HUD with a reference position to control the display position and the display timing of the guidance sign.

If display controller 140 determines that the display position of the HUD is lower than the reference position, display controller 140 makes the guidance sign be displayed earlier than normal. If the display position of the HUD is lower than the reference position, the driver looks down the HUD display, and a shorter part of the road surface ahead is within the HUD display area. Therefore, the guidance sign cannot be displayed at a long distance, and the driver can first notice the display later than in the case that the display position of the HUD is equal to the reference position. By displaying the guidance sign earlier, the guidance sign can be shown to the driver at the same timing as in the case that the display position of the HUD is equal to the reference position. The display position of the HUD is obtained by vehicle information obtaining unit 122, and is output to display controller 140.

[1-2-21. Road Surface Sign]

Display controller 140 controls the display position of the guidance sign, based on position information of a road surface sign. If there is a road surface sign (speed limit or the like) at a point where the guidance sign is typically displayed, the guidance sign overlaps the road surface sign, whereby the road surface sign is less visible. If display controller 140 determines that the display position of the guidance sign overlaps the position of the road surface sign, the display position of the guidance sign is displaced, for example, proximally to prevent the guidance sign from overlapping the road surface sign. The position information of the road surface sign is obtained by peripheral information obtaining unit 111 and, is output to display controller 140.

Further, instead of displacing the guidance sign, the guidance sign may be displayed in a light color to an extent that the guidance sign is not masked by the road surface sign. Further, if the road surface sign is a sign requiring a stop, for example, "stop" and "crosswalk," one display method may be used to tell that a stop is required. For example, the guidance sign may be displayed in yellow, or the guidance sign and the highlighted road surface sign may be alternately displayed.

[1-2-22. Road Surface Condition]

Display controller 140 controls the display position of the guidance sign, based on information of brightness of the road surface. If the brightness of the road surface is high due to, for example, reflection from a puddle or the like, the guidance sign is less visible. If the display position of the guidance sign is at or close to the position at which the brightness of the road surface is high, display controller 140 displaces the guidance sign, for example, in the front or back direction. The brightness information of the road surface is obtained by peripheral information obtaining unit 111, and is output to display controller 140.

[1-3. Operation]

With respect to the guidance signs of the above-configured display apparatus for a vehicle, specific examples of the guidance sign will be described for some conditions as examples, with reference to the drawings.

[1-3-1. Vehicle Speed]

Figure 2A:
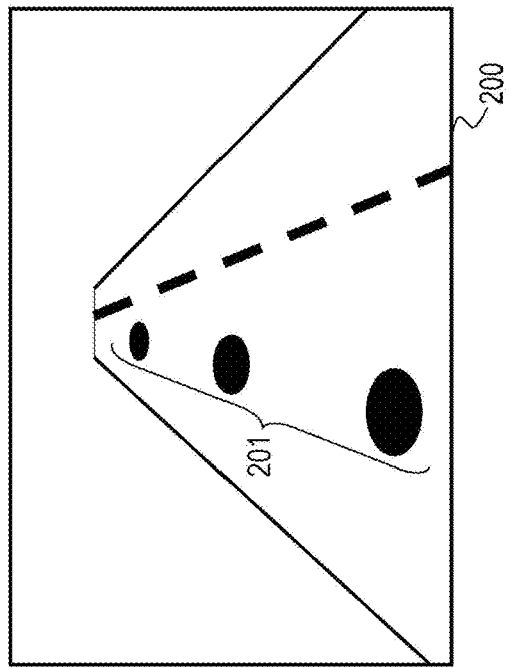
FIG. 2A is a diagram showing an example of a guidance sign in the first exemplary embodiment.

FIG. 2A and FIG. 2B show an example of the guidance sign in the first exemplary embodiment. In FIG. 2A and FIG. 2B, the row of dots is used as the guidance sign to show the state in HUD display area 200. When the distance to an intersection becomes the predetermined distance, display controller 140 starts to control the timing of displaying the dots. As shown in FIG. 2A and FIG. 2B, the row of dots is displayed such that the dots become smaller from a proximal position to a distal position.

FIG. 2A shows an example of the guidance sign in the case that the remaining distance to the intersection at which a turn is to be made is greater than the predetermined distance (for example, 100 m). FIG. 2B shows an example of the guidance sign in the case that the remaining distance to the intersection at which a turn is to be made is equal to or less than the predetermined distance (for example, 100 m). In FIG. 2A, row of dots 201 is displayed at larger intervals between the dots, and the dots are in green or blue and at low brightness. In FIG. 2B, row of dots 202 is displayed at smaller intervals, and the dots are in yellow, orange, or red and at high brightness. The change in the color, the interval, or the brightness of the dots tells the driver that the intersection at which a turn is to be made is coming close.

Note that it is not only colors, brightness, and intervals of the dots that may be changed but also the sizes or densities of the dots. The change is effective in guiding the driver, if the change is performed as in the above manner, in which as the intersection is coming closer, the intervals between the dots are made smaller, the sizes are made larger, the density is made higher, or the brightness is made higher.

Further, the displayed dots may be changed (gradation, in the case of color) at a discrete timing or a continuous timing. Further, if the dots are changed at the discrete timing, the change may be performed in any number of steps. The above predetermined distance is changed depending on the vehicle speed. If the vehicle speed is high, the predetermined distance is made longer, and if the vehicle speed is low, the predetermined distance is made shorter. For example, the predetermined distance is changed so as to adjust the display timing at which the value of (a remaining distance to the intersection)/(the vehicle speed) is constant. If the vehicle speed is 40 km/h, the predetermined distance is set to 100 m, and if the vehicle speed is 20 km/h, the predetermined distance is set to 50 m. Note that the predetermined distance does not have to be changed as the above example, and the only condition to be satisfied is that the predetermined distance is set longer when the vehicle speed is high and that the predetermined distance is set shorter when the vehicle speed is low.

[1-3-2. Inclination of Vehicle]

Figure 3A:
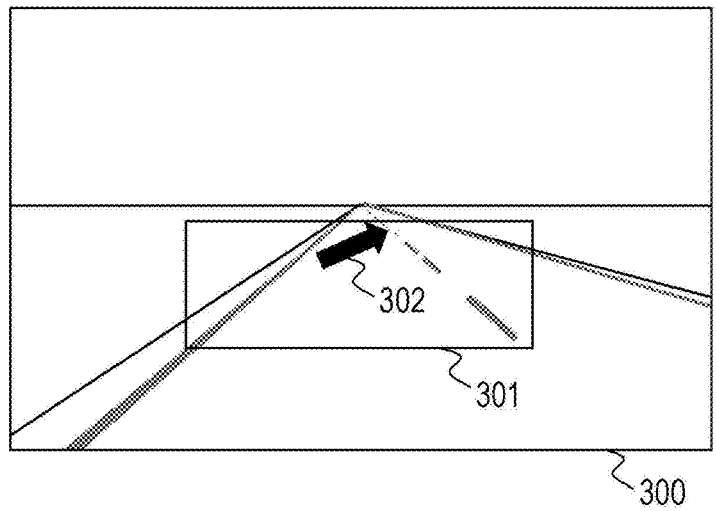
FIG. 3A is a diagram for illustrating another guidance sign in the first exemplary embodiment.
Figure 3B:
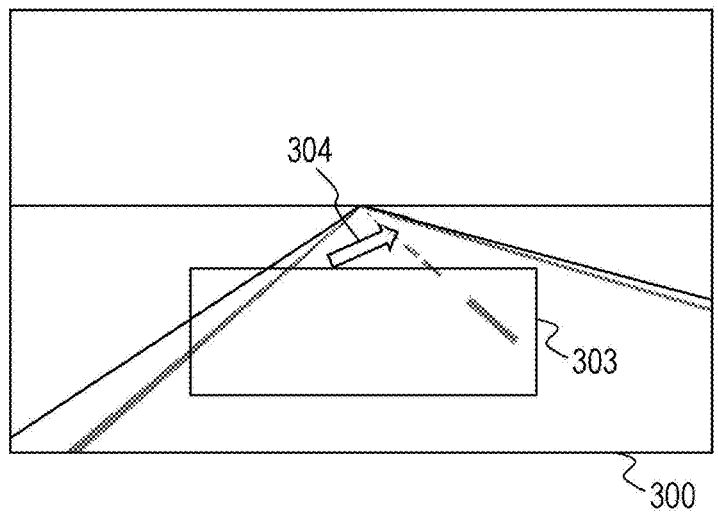
FIG. 3B is a diagram for illustrating another guidance sign in the first exemplary embodiment.
Figure 3C:
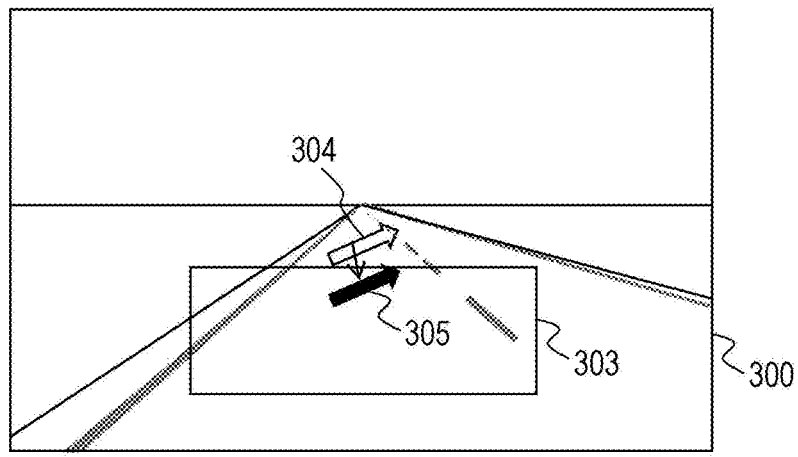
FIG. 3C is a diagram for illustrating another guidance sign in the first exemplary embodiment.

FIG. 3A to FIG. 3C are diagrams for illustrating an example of another guidance sign in the first exemplary embodiment.

FIG. 3A shows a state in which arrow 302 as the guidance sign is superimposed, in HUD display area 301, on the real image viewed through windshield 300 when the vehicle is not inclined. Here, arrow 302 is a guidance sign which guides the driver to change traffic lanes to the right.

FIG. 3B shows a state in which, because the forward inclination of the vehicle has displaced HUD display area 303 downward, arrow 304 to be displayed cannot be displayed. FIG. 3C is a state in which the arrow, which should normally be displayed at the position of arrow 304, is displayed at the position of arrow 305 in HUD display area 303. Displaying the arrow earlier can prevent the guidance sign for a lane change from not being displayed, and the driver can be guided to change traffic lanes to the right.

[1-3-3. Vibration of Vehicle]

Figure 4A:
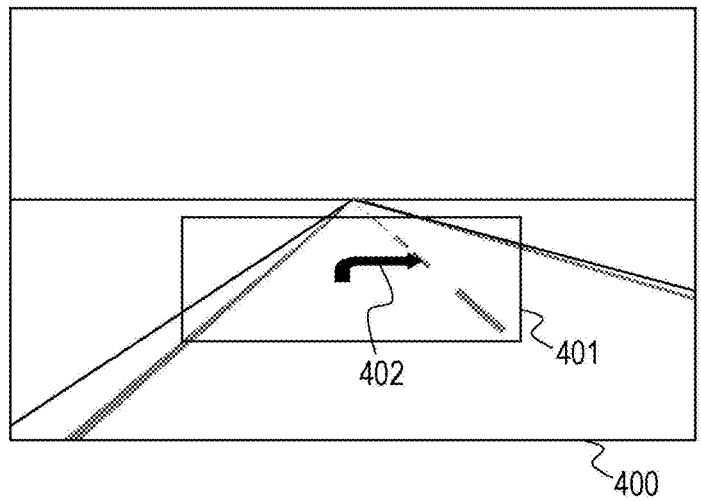
FIG. 4A is a diagram for illustrating another guidance sign in the first exemplary embodiment.
Figure 4B:
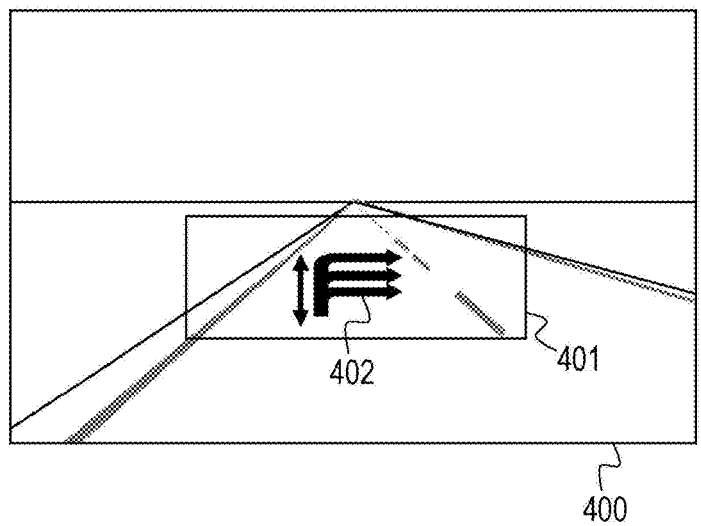
FIG. 4B is a diagram for illustrating another guidance sign in the first exemplary embodiment.
Figure 4C:
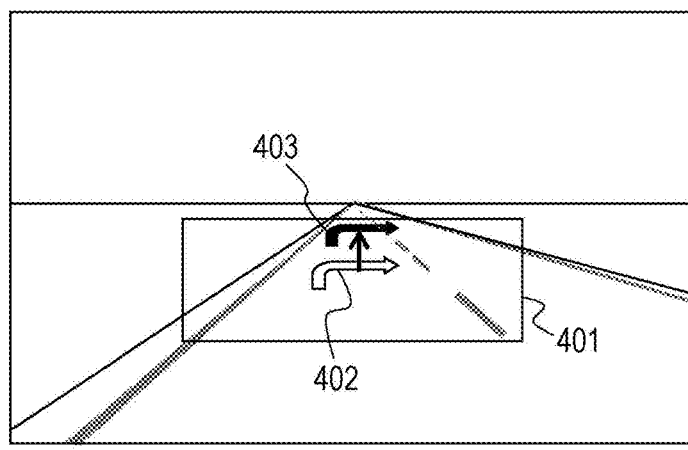
FIG. 4C is a diagram for illustrating another guidance sign in the first exemplary embodiment.

FIG. 4A to FIG. 4C are diagrams for illustrating an example of another guidance sign in the first exemplary embodiment.

FIG. 4A shows a state in which arrow 402 as the guidance sign is superimposed, in HUD display area 401, on the real image viewed through windshield 400. Here, arrow 402 is an arrow which guides the driver to make a right turn. FIG. 4B shows a state in which arrow 402 is displayed in a vibrating manner, due to a large vehicle vibration. FIG. 4C shows arrow 402 displayed at the position of arrow 403 in HUD display area 401. Displaying the arrow earlier can make it easy for the driver to estimate the distance regardless of a large vibration of the vehicle because the driver can see the guidance sign for a longer time.

[1-3-4. Height of Driver's Viewpoint]

Figure 5A:
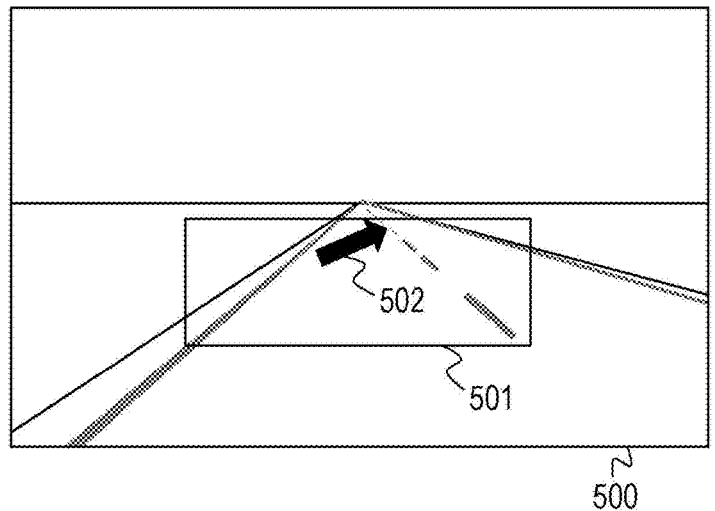
FIG. 5A is a diagram for illustrating another guidance sign in the first exemplary embodiment.
Figure 5B:
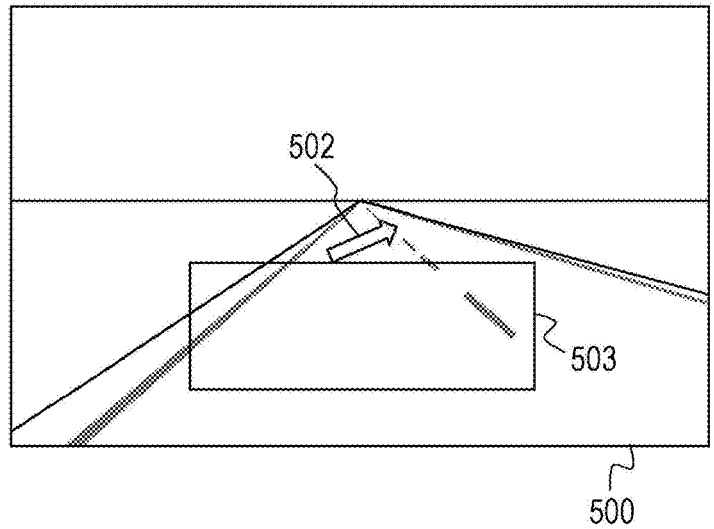
FIG. 5B is a diagram for illustrating another guidance sign in the first exemplary embodiment.
Figure 5C:
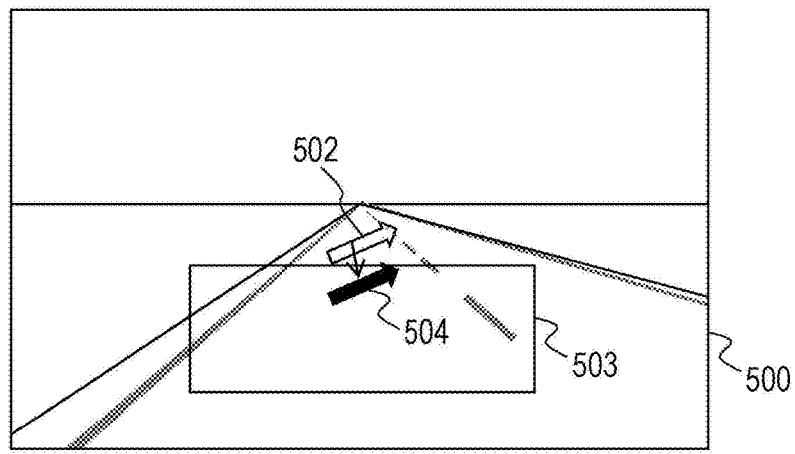
FIG. 5C is a diagram for illustrating another guidance sign in the first exemplary embodiment.

FIG. 5A to FIG. 5C are diagrams for illustrating an example of another guidance sign in the first exemplary embodiment.

FIG. 5A shows a state in which the height of the driver's viewpoint is at a reference position. FIG. 5A shows a state in which arrow 502 as the guidance sign is superimposed, in HUD display area 501, on the real image viewed through windshield 500. Here, arrow 502 is an arrow which guides the driver to change traffic lanes to the right.

FIG. 5B shows a case that the driver's viewpoint is higher than the reference position. The driver looks down the HUD display area, and the HUD display area is set to be HUD display area 503 which is at a lower position than a position of HUD display area 501 of FIG. 3A; thus, arrow 502 cannot be displayed. FIG. 5C shows a state in which arrow 504 is displayed in HUD display area 503 at the same timing as in HUD display area 501 of FIG. 5A. In this case, arrow 504 is displayed earlier than actual display position 502. Displaying the arrow earlier as described above can prevent the guidance sign for a traffic lane change from not being displayed, and the driver can be guided to change traffic lanes to the right.

[1-3-5. HUD Display Position]

Figure 6A:
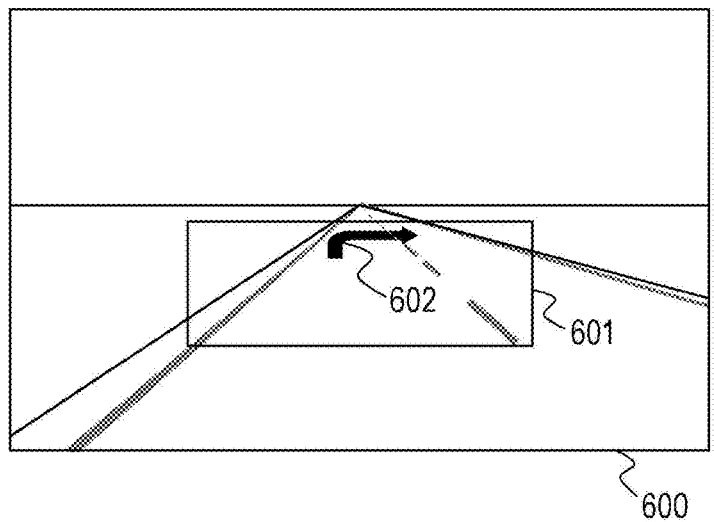
FIG. 6A is a diagram for illustrating another guidance sign in the first exemplary embodiment.
Figure 6B:
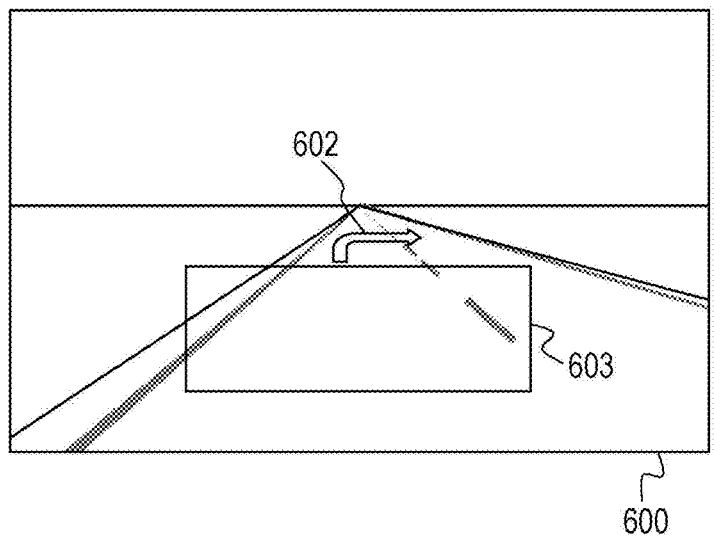
FIG. 6B is a diagram for illustrating another guidance sign in the first exemplary embodiment.
Figure 6C:
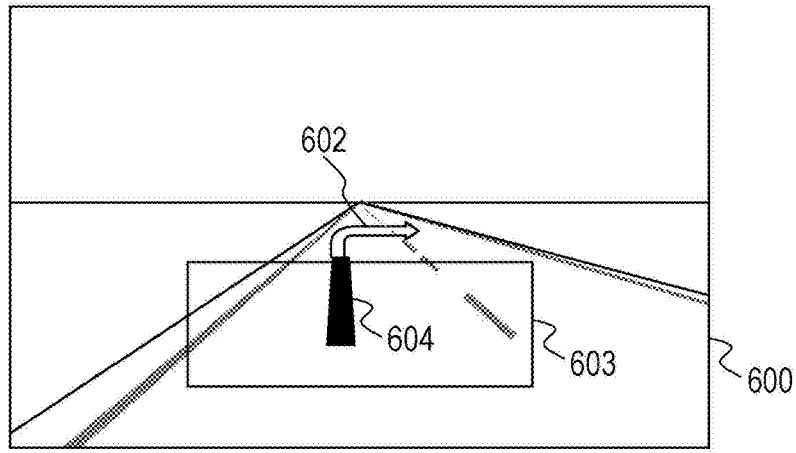
FIG. 6C is a diagram for illustrating another guidance sign in the first exemplary embodiment.

FIG. 6A to FIG. 6C are diagrams for illustrating an example of another guidance sign in the first exemplary embodiment.

FIG. 6A shows a case that the display position of the HUD is at the reference position. FIG. 6A shows a state in which arrow 602 as the guidance sign is superimposed, in HUD display area 601, on the real image viewed through windshield 600. Here, arrow 602 is an arrow which indicates a right-turning point.

FIG. 6B shows a case that the display position of the HUD is lower than the reference position of the FIG. 6A. The driver looks down HUD display area 603, and arrow 602 is not displayed. FIG. 6C shows a state in which stretched part 604, in which a root part of arrow 602 is stretched, is displayed in HUD display area 603. In this case, stretched part 604 is displayed before arrow 602 is displayed. The driver can see the guidance sign earlier by seeing stretched part 604. As described above, by displaying earlier the guidance sign incapable of being displayed, the guidance sign can be prevented from not being displayed, and it is possible to let the driver know that there is a right-turning point ahead.

[1-3-6. Road Surface Sign]

Figure 7A:
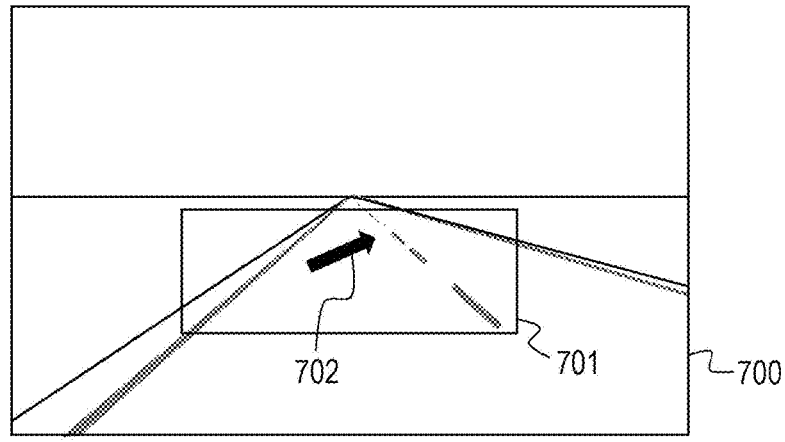
FIG. 7A is a diagram for illustrating another guidance sign in the first exemplary embodiment.
Figure 7B:
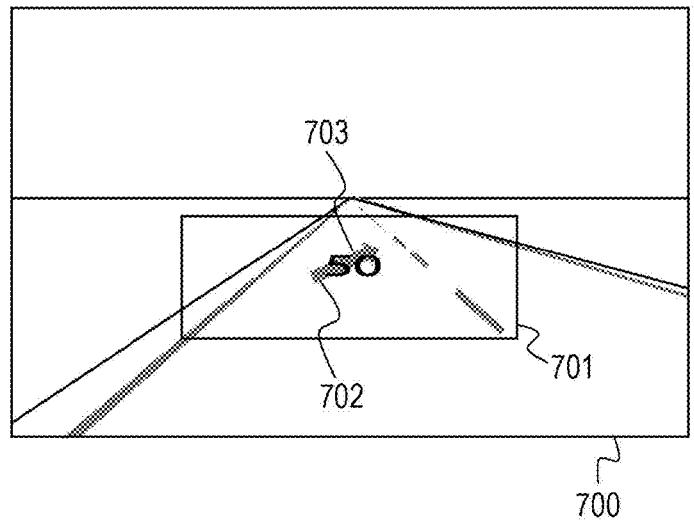
FIG. 7B is a diagram for illustrating another guidance sign in the first exemplary embodiment.
Figure 7C:
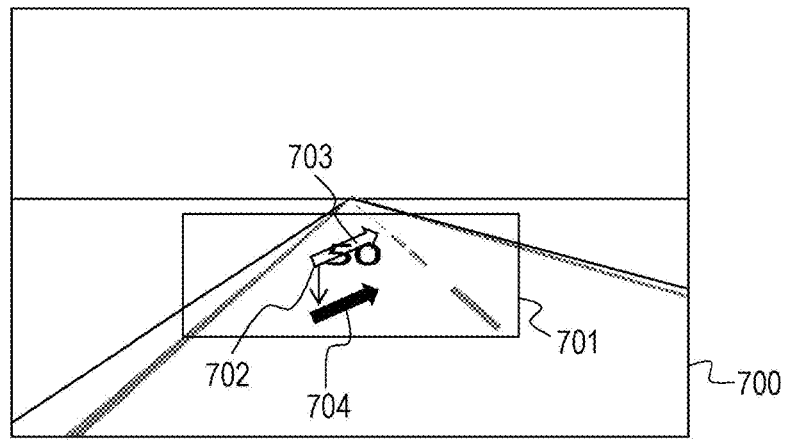
FIG. 7C is a diagram for illustrating another guidance sign in the first exemplary embodiment.

FIG. 7A to FIG. 7C are diagrams for illustrating an example of another guidance sign in the first exemplary embodiment.

FIG. 7A shows a case that there is no road surface sign. FIG. 7A shows a state in which arrow 702 as the guidance sign is superimposed, in HUD display area 701, on the real image viewed through windshield 700. Here, arrow 702 is an arrow which guides the driver to change traffic lanes to the light.

FIG. 7B shows a case that road surface sign 703 indicating a speed limit is on the road surface. In this case, arrow 702 overlapping road surface sign 703 makes road surface sign 703 less visible. FIG. 7C shows a case that arrow 702 is displaced to a position at which arrow 702 does not overlap road surface sign 703. In FIG. 7C, arrow 704 is displayed at a distal position from road surface sign 703. As described above, if the road surface sign overlaps the guidance sign, the guidance sign is made easy to see by displaying the guidance sign and the road surface sign at positions displaced from each other.

[1-3-7. Road Surface Condition]

Figure 8A:
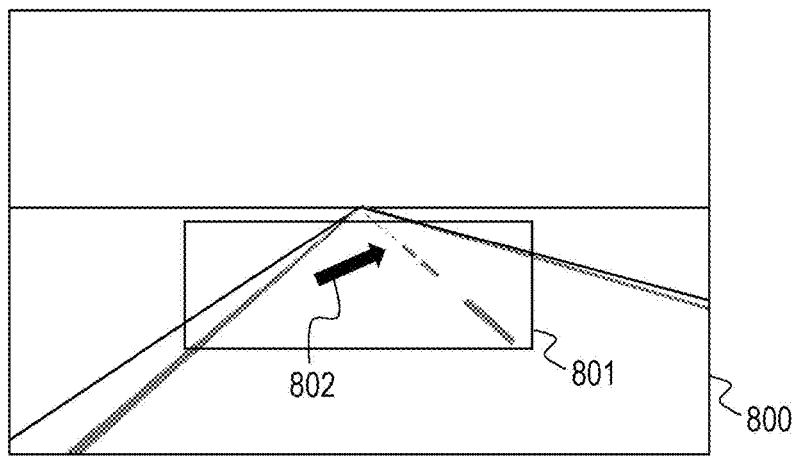
FIG. 8A is a diagram for illustrating another guidance sign in the first exemplary embodiment.
Figure 8B:
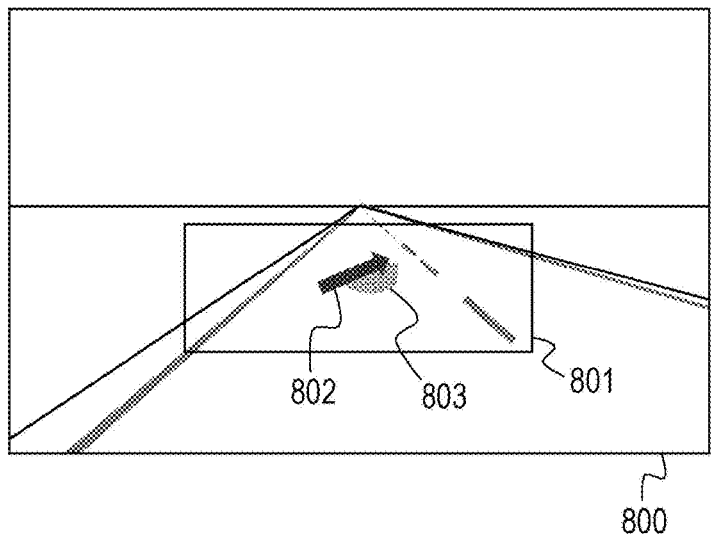
FIG. 8B is a diagram for illustrating another guidance sign in the first exemplary embodiment.
Figure 8C:
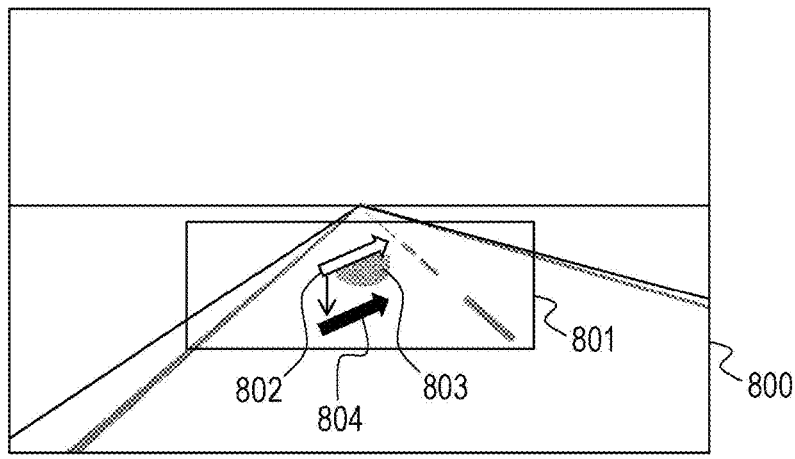
FIG. 8C is a diagram for illustrating another guidance sign in the first exemplary embodiment.

FIG. 8A to FIG. 8C are diagrams for illustrating an example of another guidance sign in the first exemplary embodiment.

FIG. 8A shows a case that there is no puddle on the road surface. FIG. 8A shows a state in which arrow 802 as the guidance sign is superimposed, in HUD display area 801, on the real image viewed through windshield 800. Here, arrow 802 is an arrow which indicates a right-turning point.

FIG. 8B shows a case that puddle 803 is on the road surface. In this case, arrow 802 overlaps puddle 803, and arrow 802 is less visible due to reflection from puddle 803 or the like. FIG. 8C shows a case that arrow 802 is displaced to a position at which arrow 802 does not overlap puddle 803. In the case of FIG. 8C, arrow 804 is displayed at a position distal from puddle 803. As described above, if the guidance sign is made less visible in some areas in which a road surface condition is not appropriate, the guidance sign is made to be easier to see by displaying the guidance sign displaced from such areas.

[1-3-8. Peripheral Vehicles]

Figure 9A:
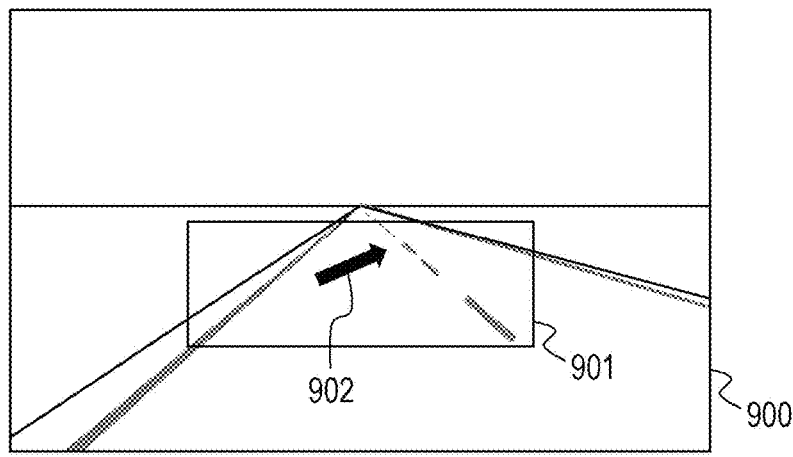
FIG. 9A is a diagram for illustrating another guidance sign in the first exemplary embodiment.
Figure 9B:
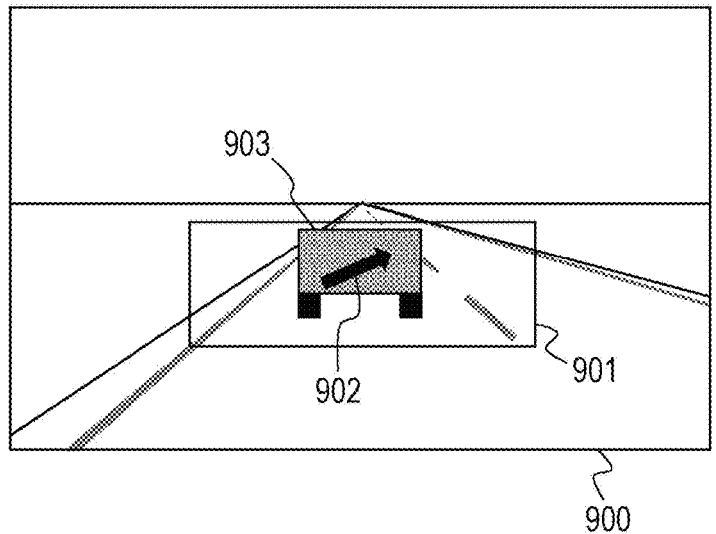
FIG. 9B is a diagram for illustrating another guidance sign in the first exemplary embodiment.
Figure 9C:
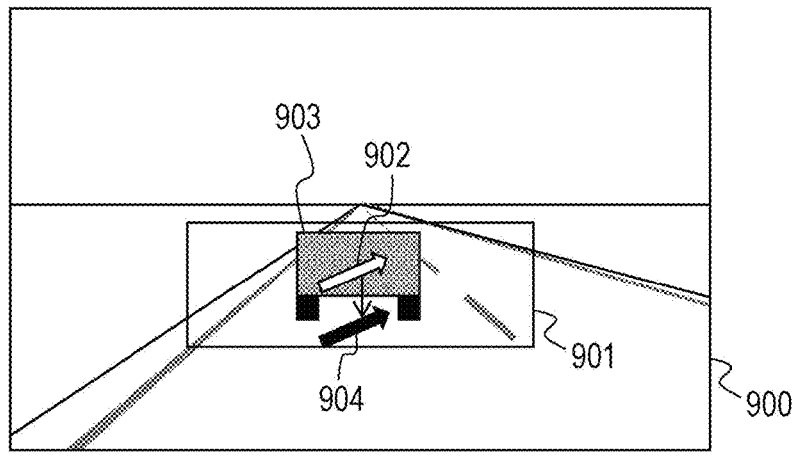
FIG. 9C is a diagram for illustrating another guidance sign in the first exemplary embodiment.

FIG. 9A to FIG. 9C are diagrams for illustrating an example of another guidance sign in the first exemplary embodiment.

FIG. 9A shows a case that there is no vehicle around the vehicle. FIG. 9A shows a state in which arrow 902 as the guidance sign is superimposed, in HUD display area 901, on the real image viewed through windshield 900. Here, arrow 902 is a guidance sign which guides the driver to change traffic lanes to the right.

FIG. 9B shows a case that vehicle 903 is running ahead of the vehicle. In this case, arrow 902 overlaps front vehicle 903 so that arrow 902 is less visible. FIG. 9C shows a case that arrow 902 is displaced to a position at which arrow 902 does not overlap front vehicle 903. In the case of FIG. 9C, arrow 904 is displayed at a position distal from front vehicle 903. If there is a vehicle around the vehicle as described above, the guidance sign is made to be easier to see by displaying such that the guidance sign does no overlap the peripheral vehicle.

[1-4. Advantageous Effect and the Like]

As described above, in the present exemplary embodiment, display controller 140 determines the display position and the display timing of the guidance sign, depending on the route information and depending on the display area of the display unit on the driver's front view, and causes display unit 150 to display the guidance sign at the determined display timing at the determined display position. Display controller 140 changes any one or both of the determined display position and the determined display timing when at least one of the road environment information, the driving state information, and the route information satisfies the predetermined condition under which the guidance sign cannot be displayed in the display area.

The predetermined condition is what causes the display area to be changed, and examples of the predetermined condition include the road shape, the inclination of the vehicle, the height of the driver's viewpoint, and the display position of the HUD.

Further, the predetermined condition is that there is a cause to disturb the guidance sign to be recognized, and examples of the predetermined condition include weather, brightness around the vehicle, time, a peripheral vehicle, vibration of the vehicle, a road surface sign, and a road surface condition.

Based on the condition, it is possible to guide the driver to a route at an appropriate timing which includes added necessary time, depending on the driving environment information, the driving state information, and the route information. Here, if route guidance were provided at a fixed timing, for example, a high traveling speed, for example, would provide guidance without enough time left, and the driver would get into danger with, for example, sudden braking. Alternatively, a low traveling speed would provide guidance a long distance before the intersection, and the guidance could not be an indication for the driver's preparation to make a right or left turn, but would be annoying guidance to the driver.

Therefore, it is possible to reduce sudden braking due to late guidance and to reduce disturbance to the driver caused by annoyance due to too early guidance.

Further, in the present exemplary embodiment, the display apparatus for a vehicle further includes learning unit 160 which learns the driving operation of the driver.

With this arrangement, display controller 140 controls, in consideration of also the information output from learning unit 160, the display position and display timing of the information to be displayed on display unit 150. Therefore, it is possible to guide at a timing corresponding to the characteristics of the driving operation of the driver.

Further, if the arrow cannot be viewed due to change in the HUD display area caused by undulation of the road, a curve of the road, displacement of the viewpoint, or other causes, the form of the displayed arrow may be changed.

Second Exemplary Embodiment

In the present exemplary embodiment, a case will be described in which a plurality of guidance signs are displayed in combination.

In the present exemplary embodiment, a case will be described as an example in which, at a time of display in the vicinity of an intersection, in addition to a row of dots in the first exemplary embodiment, an arrow indicating which direction to turn to is also displayed at a left or right turning point, and in which display controller 140 controls the displayed arrow, depending on the predetermined conditions.

FIG. 10A to FIG. 10D are diagrams for showing an example of a guidance sign in a second exemplary embodiment.

FIG. 10A shows the display state when an intersection is away, FIG. 10B shows the display state before entrance into the intersection, and FIGS. 10C and 10D show the display state at the time of entrance into the intersection. FIG. 10A to FIG. 10D show the state of HUD display area 1000.

As shown in FIG. 10A, when the intersection comes close at a predetermined distance, arrow 1001 indicating a left or right turn starts to be displayed together with dot sign 1002. As shown in FIG. 10B, before entrance into the intersection, the color of arrow 1001 is changed to a color and brightness which are not annoying to the driver.

Here, if the vehicle speed is higher than a predetermined vehicle speed, display controller 140 controls, depending on the speed, the timing when arrow 1001 disappears. In the second exemplary embodiment, arrow 1001 is controlled to disappear earlier as the speed at the time of entrance into the intersection is higher. This arrangement reduces the time for which arrow 1001 blocks the front view, and accordingly safety is improved. FIG. 10C shows the state in which arrow 1001 has disappeared in the case that the speed is high.

If the vehicle stops before intersection, display controller 140 controls arrow 1001 not to disappear. That is because if arrow 1001 has disappeared when the vehicle stops at the intersection and if the driver forgets which direction to turn to, the driver may take the wrong road. FIG. 10D shows a state in which arrow 1001 is displayed when the vehicle stops at the intersection.

As described above, in the present exemplary embodiment, the guidance is displayed with a combination of the plurality of guidance signs. With this arrangement, it is possible to provide the driver with route guidance at an appropriate timing.

Third Exemplary Embodiment

In the first exemplary embodiment, the display position and the display timing of the guidance sign are changed depending on various conditions. However, the driver does not know that the guidance sign is displayed at a timing different from the timing at which the guidance sign should be originally displayed. In a third exemplary embodiment, a case is described in which it is clearly indicated to the driver that the guidance sign is displayed at a timing different from the original display timing.

For example, in the first exemplary embodiment, the case is described in which, if the guidance sign cannot be displayed in the HUD display area, the position of the HUD display area is changed. In such a case, other than changing the HUD display area, a display form of the guidance sign may be changed to a manner different from the normal manner (blinking, changing the color, displaying only the contour, and the like). With this operation, it can be indicated that the point just ahead of the arrow is not yet the point at which a turn is to be made.

Figure 11A:
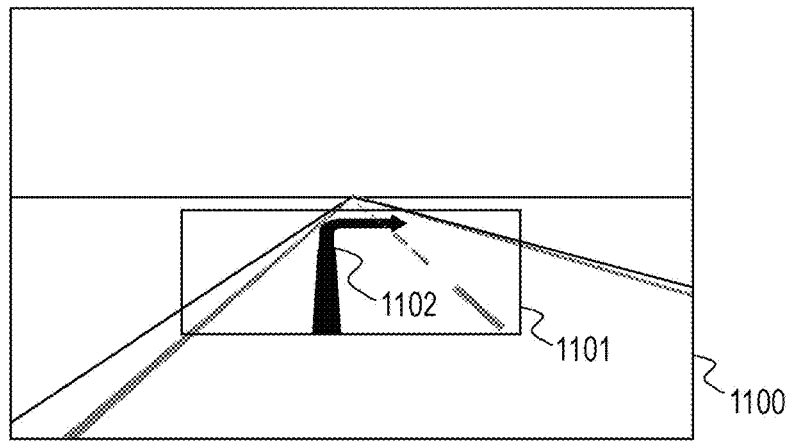
FIG. 11A is a diagram for illustrating an example of a guidance sign in a third exemplary embodiment.
Figure 11B:
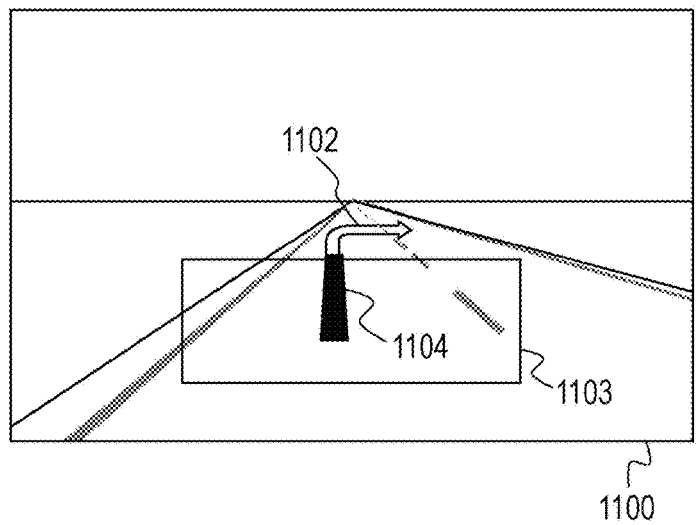
FIG. 11B is a diagram for illustrating an example of the guidance sign in the third exemplary embodiment.
Figure 11C:
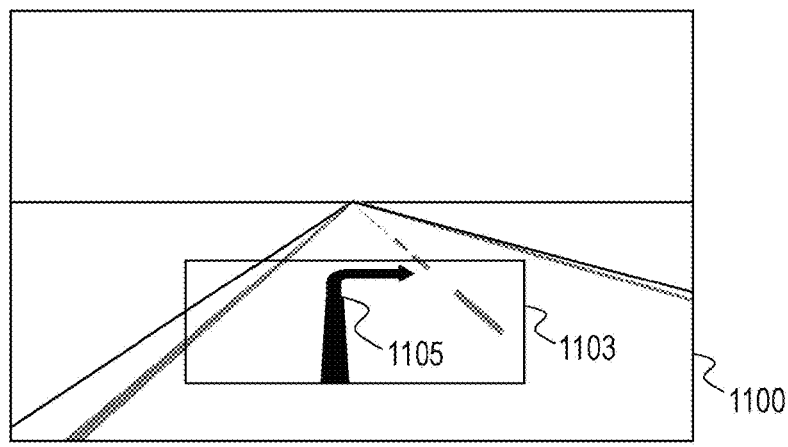
FIG. 11C is a diagram for illustrating an example of the guidance sign in the third exemplary embodiment.

FIG. 11A to FIG. 11C are diagrams showing an example of a guidance sign of the third exemplary embodiment.

FIG. 11A shows a normal display state. FIG. 11A shows a state in which arrow 1102 as the guidance sign is superimposed, in HUD display area 1101, on the real image viewed through windshield 1100. Here, arrow 1102 is an arrow which indicates a right-turning point.

FIG. 11B shows a case that HUD display area 1101 in FIG. 11A is displaced to HUD display area 1103. In this case, arrow 1102 except root part 1104 is out of HUD display area 1103 and is not displayed. FIG. 11C shows a case that the arrow is displaced into HUD display area 1103. In the case of FIG. 11C, arrow 1105 whose display position has been moved is further made to blink. By displaying, in a different manner from normal as described above, the guidance sign whose position has been moved, it can be indicated that the guidance sign is displayed in a different timing (earlier or later) from the original timing of the guidance sign; thus, the driver can be prevented from driving wrongly.

Note that the examples of FIG. 11A to FIG. 11C are just examples, and the display form may be changed to be different from normal with respect to other conditions.

As described above, in the present exemplary embodiment, if one or both of the determined display position and the determined display timing are changed, the display form of the guidance sign is changed. With this arrangement, it is possible to provide the driver with route guidance at an appropriate timing.

Other Exemplary Embodiment

In the above description, the first to third exemplary embodiments are described as examples of the technology disclosed in the application. However, the technology in the present disclosure is not limited to the above description, and the technology can be applied to an exemplary embodiment in which modification, replacement, addition, removal, and the like are made. Further, the components descried in the above first to third exemplary embodiments can be combined to make a new exemplary embodiment.

Then, examples of other exemplary embodiments will be described below.

In the first exemplary embodiment, driving environment obtaining unit 110 includes peripheral information obtaining unit 111, road information obtaining unit 112, and communication unit 113; however, driving environment obtaining unit 110 is not limited to the above configuration and only has to include any component if the component can obtain information indicating a driving environment.

In the first exemplary embodiment, driving state obtaining unit 120 includes driver information obtaining unit 121 and vehicle information obtaining unit 122; however, driving state obtaining unit 120 is not limited to the above configuration, and a unit or the like may be provided which obtains a state inside the vehicle.

In the first exemplary embodiment, the route is displayed by a row of dots; however, the route may be displayed by other marks if the driver can recognize the marks. For example, a graphical indication may be used which looks like a carpet rolled out on the current traffic lane, or a row of triangles and a row of arrows may be used instead of a row of dots.

The present disclosure can be applied to a display apparatus for a vehicle which displays a route to a driver. Specifically, the present disclosure can be applied to a system having a head-up display, a navigation system, or other systems.

What is claimed is:

1. A display apparatus for a vehicle comprising:
a route guiding unit which generates route information for providing guidance on a route to a destination;
a display unit which displays a guidance sign to be superimposed on a driver's front view, the guidance sign indicating a route from a traveling position of the vehicle to a guide point; and
a display controller which determines a display timing of the guidance sign, depending on the route information and depending on a display area of the display unit on the driver's front view and driving state information, and which causes the display unit to display the guidance sign at the determined display timing at a reference position of a viewpoint of the driver,
wherein when the reference position and a normal display timing satisfy a predetermined condition in which the driver would notice the guidance sign late, the display controller causes the guidance sign to be displayed earlier than the normal display timing, and
the predetermined condition is when a height of the viewpoint of the driver is higher than the reference position of the viewpoint of the driver.

2. A display method of a display apparatus for a vehicle, the display apparatus including: a route guiding unit which generates route information for providing guidance on a route to a destination; and a display unit which displays a guidance sign to be superimposed on a driver's front view, the guidance sign indicating a route from a traveling position of the vehicle to a guide point, the display method comprising:
determining a display timing of the guidance sign, depending on the route information and depending on a display area of the display unit on the driver's front view and driving state information;
causing the display unit to display the guidance sign at the determined display timing at a reference position of a viewpoint of the driver; and
causing the guidance sign to be displayed earlier than a normal display timing, when the reference position and the normal display timing satisfy a predetermined condition in which the driver would notice the guidance sign late,
wherein the predetermined condition is when a height of the viewpoint of the driver is higher than the reference position of the viewpoint of the driver.

3. A display apparatus for a vehicle comprising:
a route guiding unit which generates route information for providing guidance on a route to a destination;
a display unit which displays a guidance sign to be superimposed on a driver's front view, the guidance sign indicating a route from a traveling position of the vehicle to a guide point; and
a display controller which determines a display timing of the guidance sign, depending on the route information and depending on a display area of the display unit on the driver's front view and driving state information, and which causes the display unit to display the guidance sign at the determined display timing a reference position of a viewpoint of the driver,
wherein when the reference position and a normal display timing satisfy a predetermined condition in which the driver would notice the guidance sign late, the display controller causes the guidance sign to be displayed earlier than the normal display timing, and
the predetermined condition is when a height of viewpoint of the driver is lower than the reference position of the viewpoint of the driver.

* * * * *